United States Patent
Tsuji et al.

(10) Patent No.: US 9,522,611 B2
(45) Date of Patent: Dec. 20, 2016

(54) INVERTED PENDULUM VEHICLE

(71) Applicant: Murata Manufacturing Co., Ltd., Kyoto (JP)

(72) Inventors: Shigeru Tsuji, Kyoto (JP); Kenichi Shirato, Kyoto (JP); Masayuki Kubo, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/644,285

(22) Filed: Mar. 11, 2015

(65) Prior Publication Data

US 2015/0183340 A1 Jul. 2, 2015

Related U.S. Application Data

(63) Continuation of application No. PCT/JP2013/069588, filed on Jul. 19, 2013.

(30) Foreign Application Priority Data

Sep. 18, 2012 (JP) .................................. 2012-204012

(51) Int. Cl.
*B60L 15/10* (2006.01)
*B60L 15/20* (2006.01)
(Continued)

(52) U.S. Cl.
CPC .................. *B60L 15/10* (2013.01); *B60L 3/00* (2013.01); *B60L 7/24* (2013.01); *B60L 11/18* (2013.01);
(Continued)

(58) Field of Classification Search
CPC .............. G05D 1/02; G05D 1/08; B60L 15/10
See application file for complete search history.

(56) References Cited

U.S. PATENT DOCUMENTS

2010/0280745 A1* 11/2010 Gorai ..................... B62K 3/007
701/124
2011/0098884 A1* 4/2011 Doi ........................ B62K 3/007
701/36
(Continued)

FOREIGN PATENT DOCUMENTS

JP 2007-336785 A 12/2007
JP 2011-168236 A 9/2011

OTHER PUBLICATIONS

English translation of Written Opinion of the International Search Authority for Application No. PCT/JP2013/069588 dated Oct. 15, 2013.

*Primary Examiner* — Todd Melton
(74) *Attorney, Agent, or Firm* — Pearne & Gordon LLP (57) ABSTRACT

A tire angular velocity controller (211) is input with a difference between a target value of a rotational angular velocity of 0 for main wheels (11) and a rotational angular velocity of the main wheels (11), which is a differential value of a signal output from a main wheels rotary encoder (26). The tire angular velocity controller (211) calculates an inclination angle for the main body (10) that will cause the difference to become zero. In a second control mode, the calculated inclination angle is used as a target inclination angle and the difference between this target inclination angle and the inclination angle of the main body (10) at the present time input from an inclination angle sensor (20) is input to a main body inclination angle controller (212).

7 Claims, 4 Drawing Sheets

(51) Int. Cl.
*B62K 3/00* (2006.01)
*G05D 1/08* (2006.01)
*B60L 3/00* (2006.01)
*B60L 7/24* (2006.01)
*B60L 11/18* (2006.01)

(52) U.S. Cl.
CPC ............... *B60L 15/20* (2013.01); *B62K 3/007* (2013.01); *G05D 1/0891* (2013.01); *B60L 2200/16* (2013.01); *B60L 2240/423* (2013.01); *B60L 2240/463* (2013.01); *B60L 2260/34* (2013.01); *Y02T 10/645* (2013.01); *Y02T 10/7005* (2013.01); *Y02T 10/72* (2013.01); *Y02T 10/7275* (2013.01)

(56) References Cited

U.S. PATENT DOCUMENTS

| | | | |
|---|---|---|---|
| 2011/0118968 A1* | 5/2011 | Takenaka | B62K 1/00 701/124 |
| 2012/0166048 A1* | 6/2012 | Inoue | B62K 3/007 701/49 |

* cited by examiner

INVERTED PENDULUM VEHICLE

BACKGROUND OF THE INVENTION

Field of the Invention

The present invention relates to a moving body that is equipped with wheels and in particular relates to a moving body that controls driving of its wheels.

Description of the Related Art

In the related art, a moving body is known that controls driving of its wheels by performing inverted pendulum control. For example, Patent Document 1 describes a moving body that is a coaxial two-wheel vehicle that performs inverted pendulum control and is equipped with a stabilizing wheel in front of its main wheels.

Patent Document 1: Japanese Unexamined Patent Application Publication No. 2011-168236

BRIEF SUMMARY OF THE INVENTION

However, in inverted pendulum control, although control is performed to maintain the inclination angle of a main body at a certain angle with respect to a vertical direction, control is not performed to cause the main body to stop in place. Therefore, there is a possibility that the main body may unintentionally move on a slope for example due to the gravitational torque generated by the inclination of the slope.

Accordingly, an object of the present invention is to provide a moving body that prevents a main body from unintentionally moving due to the gravitational torque on a slope.

A moving body of the present invention includes a wheel; a main body for supporting the wheel rotatably in a pitch direction; a driving control unit for controlling driving of the wheel; angular change detection means for detecting an angular change of the main body in the pitch direction; and rotational angle detection means for detecting a rotational angle of the wheel.

The driving control unit executes a first control mode in which rotation of the wheel is controlled on the basis of an output of the angular change detection means such that the angular change of the main body becomes zero and such that an angle of the main body with respect to a vertical direction becomes a first angle, and a second control mode in which rotation of the wheel is controlled on the basis of an output of the rotational angle detection means such that a change in the rotational angle of the wheel becomes zero. The first control mode and the second control mode are switched between by using switching means.

In the first control mode, the inclination angle of the main body is maintained at the first angle through inverted pendulum control. For example, the driving control unit calculates a torque to apply to the wheel and drives the wheel such that the inclination angle of the main body with respect to the vertical direction is maintained at zero and such that the angular velocity is maintained at zero. In this first control mode, the moving body is in a freestanding state and control is not performed to stop the main body in place and therefore a user is able to use the moving body as a handcart by pushing the main body.

In the first control mode, when a switching instruction is issued by a selector switch for example, switching to the second control mode is performed. In the second control mode, control is performed such that the change in the rotational angle of the wheel becomes zero. That is, the driving control unit makes a rotational angular velocity of zero be a target value upon switching to the second control mode from the first control mode and calculates a torque to apply to the wheel such that the difference between this target value and the rotational angular velocity will become zero. For example, the driving control unit calculates the difference between a rotational angular velocity of the wheel of 0 and the rotational angular velocity of the wheel detected at the present time and calculates an inclination angle of the main body that will make the difference become zero. The driving control unit calculates a torque to apply to the wheel such that the inclination angle of the main body with respect to the vertical direction will become the calculated inclination angle and such that the angular velocity will become zero. In the above-described example, the driving control unit performs control such that the inclination angle of the main body becomes equal to a target inclination angle, but may instead simply perform control such that the rotational angular velocity of the wheel becomes zero.

In the second control mode, the rotational angular velocity of the wheel remains at zero and therefore the main body remains in place even if gravitational torque is exerted on a slope. Therefore, it is possible to prevent the main body from unintentionally moving due to gravitational torque on a slope.

Switching between the first control mode and the second control mode may be instructed by the user using their hand, but for example it also is possible to provide a touch sensor that detects a person's touch in part of the main body such that the first control mode is executed when there is a touch and the second control mode is executed when there is no touch. In this case, it is possible for the user to go up or down a slope while using the moving body as a handcart and since the moving body stops in place when the user releases their hands, safety is improved.

In addition, it is preferable that the moving body of the present invention include gradient detection means for detecting a ground gradient (inclination angle of ground with respect to horizontal plane). In this case, in the second control mode, it is possible to perform feed forward control in which a torque compensate compensating for gravitational torque due to a ground gradient is applied and it is possible to calculate an inclination angle of the main body to the vertical direction compensating for the gravitational torque due to the ground gradient and correct the target inclination angle using feed forward control.

According to the present invention, it is possible to prevent the main body from unintentionally moving due to the gravitational torque on a slope.

DETAILED DESCRIPTION OF THE INVENTION

Figure 1:
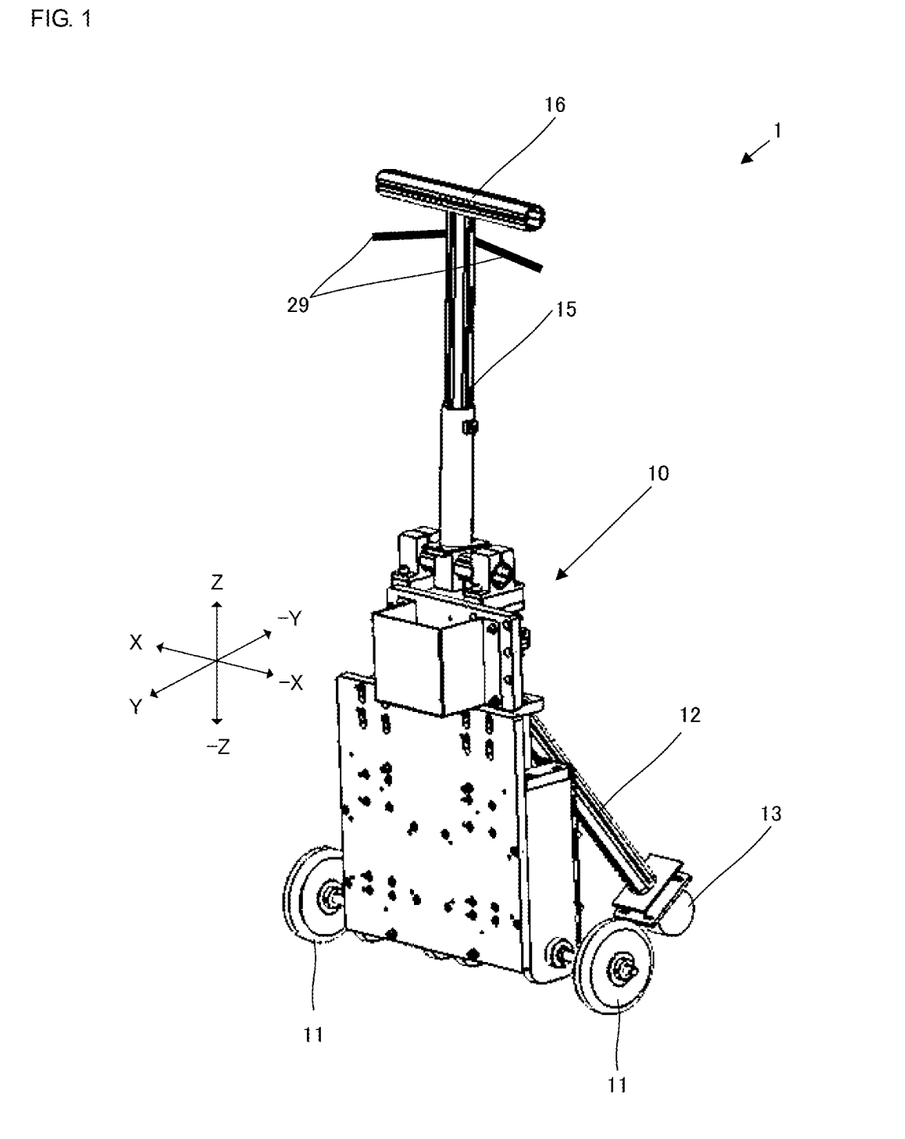
FIG. 1 is an outline view of a coaxial two-wheel vehicle.
Figure 2:
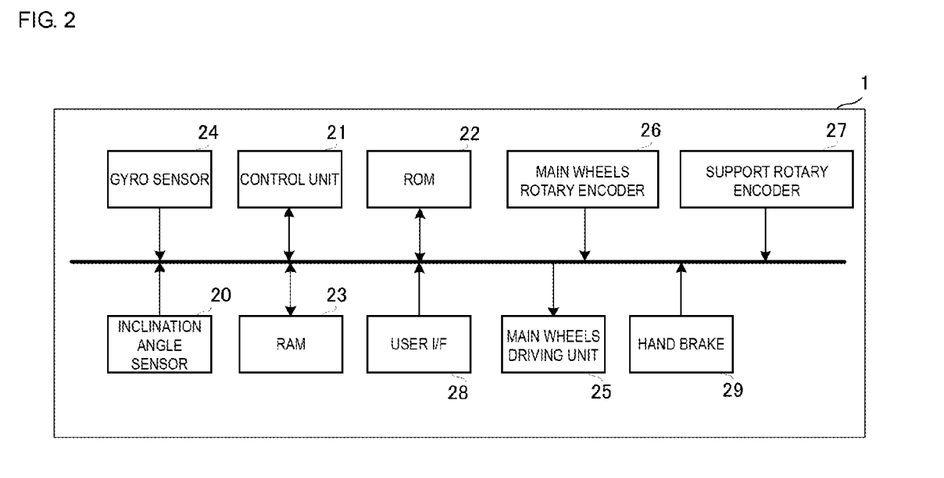
FIG. 2 is a control configuration diagram illustrating a configuration of the coaxial two-wheel vehicle.

FIG. 1 is an outline view of a coaxial two-wheel vehicle 1, which is an embodiment of a moving body of the present invention. FIG. 2 is a control configuration diagram illustrating a configuration of the coaxial two-wheel vehicle 1.

The coaxial two-wheel vehicle 1, for example, includes a rectangular-parallelepiped-shaped main body 10. The main body 10 has a shape that is long in a vertical direction (Z, –Z direction in figure) and short in a depth direction (Y, Y– direction in figure). The main body 10 has a control substrate, a battery and so forth built into the inside thereof.

Main wheels 11 are attached to a right-side (X direction in figure) end portion and a left-side (–X direction in figure) end portion of a lower portion of the main body 10 in the vertical direction (–Z direction). These pair of main wheels 11 are attached to the same axle and rotate synchronously. However, the main wheels 11 can be instead driven and made to rotate individually. In addition, in this embodiment, an example is described in which there are two main wheels 11, but there may instead be one main wheel 11 or three or more main wheels 11.

For example, one end of a cylindrical handle 15 is attached to an upper portion of the main body 10 in the vertical direction and a T-shaped grip 16 is attached to the other end of the handle 15. A user interface such as a power supply switch (user I/F 28 illustrated in FIG. 2) is provided on the grip 16. A hand brake 29 is attached to the handle 15 at a position close to the grip 16 (the hand brake is not an essential element in the present invention). A user is able to grasp the grip 16 or place their forearms on the grip 16 in order to push the coaxial two-wheel vehicle 1 through friction between the grip and the user's forearms or the like.

In reality, a cover is attached to the main body 10 and the substrate and so forth inside the main body 10 cannot be seen from the outside.

One end of a rod-shaped support 12 is attached to a back surface of the main body 10 (–Y direction). This one end of the support 12 is rotatably connected to the main body 10. A stabilizing wheel 13 is attached to the other end of the support 12. The support 12 supports the main body 10 and is for preventing the main body 10 from falling over. The support 12 and the stabilizing wheel 13 are not essential elements in the present invention, but by providing the stabilizing wheel 13, the coaxial two-wheel vehicle can be pushed even in a state where the main body 10 is greatly inclined from the vertical direction when the power is off due to the main wheels 11 and the stabilizing wheel 13 being in contact with the ground. In addition, there may be two or more supports 12 and stabilizing wheels 13.

Next, the configuration and basic operation of the coaxial two-wheel vehicle 1 will be described. As illustrated in FIG. 2, the coaxial two-wheel vehicle 1 includes an inclination angle sensor 20, a control unit 21, a ROM 22, a RAM 23, a gyro sensor 24, a main wheels driving unit 25, a main wheels rotary encoder 26, a support rotary encoder 27, the user I/F 28 and the hand brake 29.

The control unit 21 is a functional unit that controls the coaxial two-wheel vehicle 1 in an integrated manner and implements various operations by reading out a program stored in the ROM 22 and expanding the program in the RAM 23. The inclination angle sensor 20 detects an inclination angle of the main body 10 in a pitch direction (the rotational direction around the axle of main wheels 11 in FIG. 1) with respect to the vertical direction and outputs the detected inclination angle to the control unit 21. The gyro sensor 24 detects an angular velocity of the main body 10 in the pitch direction and outputs the detected angular velocity to the control unit 21. In addition, the coaxial two-wheel vehicle 1 may for example further include an acceleration sensor that detects an acceleration of the main body 10 in each direction and a rotary encoder that detects a rotational angle of the stabilizing wheel 13.

The main wheels rotary encoder 26 detects a rotational angle of the main wheels 11 and outputs the detection result to the control unit 21. The support rotary encoder 27 detects an intersection angle, which is an angle formed by the main body 10 and the support 12, and outputs the detection result to the control unit 21.

As a basic operation (hereafter, referred to as first control mode), the control unit 21 detects a change in the inclination angle of the main body 10 in the pitch direction on the basis of the detection results of the gyro sensor 24 and the inclination angle sensor 20 and controls the main wheels driving unit 25 such that the angular change of the main body 10 in the pitch direction becomes zero and that the inclination angle of the main body 10 with respect to the vertical direction becomes a first value (zero or a value close to zero).

Figure 3:
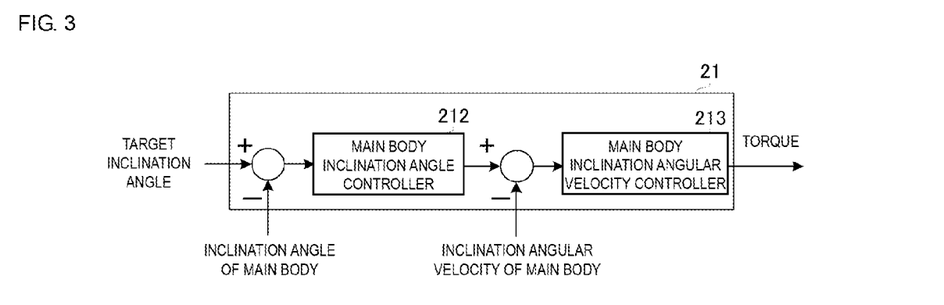
FIG. 3 is a block diagram of a control unit 21 at the time of a first control mode.

FIG. 3 is a block diagram of the control unit 21 at the time of the first control mode. In the first control mode, the control unit 21 includes a main body inclination angle controller 212 and a main body inclination angular velocity controller 213. The main body inclination angle controller 212 is input with the difference between a target inclination angle (first value: 0° for example) and the inclination angle of the main body 10 at the present time input from the inclination angle sensor 20 and calculates an inclination angular velocity for the main body 10 that will make the difference become 0. The main body inclination angular velocity controller 213 is input with the difference between the inclination angular velocity calculated by the main body inclination angle controller 212 and the inclination angular velocity of the main body 10 at the current time input from the gyro sensor 24 and calculates a torque to apply so that the difference will become zero.

The main wheels driving unit 25 is a functional unit that drives a motor that causes the axle to which the main wheels 11 are attached to rotate, and applies the torque calculated by the main body inclination angular velocity controller 213 to the motor of the main wheels 11 and thereby causes the main wheels 11 to rotate.

In this way, as the first control mode, the coaxial two-wheel vehicle 1 performs control such that inverted pendulum control is performed and the posture of the main body 10 is maintained fixed. Since the coaxial two-wheel vehicle 1 maintains a fixed posture even when a user pushes the coaxial two-wheel vehicle 1 by grasping the grip 16, the coaxial two-wheel vehicle 1 can be used as a handcart.

Here, an example is illustrated in which the gyro sensor 24 and the inclination angle sensor 20 are used as means for detecting a change in the inclination angle of the main body 10 in the pitch direction, but instead an acceleration sensor can be used or another type of sensor may be used.

In addition, an example is illustrated in which the main body inclination angle controller 212 is input with the difference between a target inclination angle (0° for example) and the inclination angle of the main body 10 at the present time input from the inclination angle sensor 20, but instead the target inclination angle (for example 0°) may be a combination of the inclination angle of the main body 10 with respect to a direction orthogonal to the ground and the gradient of the slope. The inclination angle of the main body 10 with respect to a direction orthogonal to the ground can be calculated from an intersection angle between the main body 10 and the support 12 input from the support rotary encoder 27.

Figure 5:
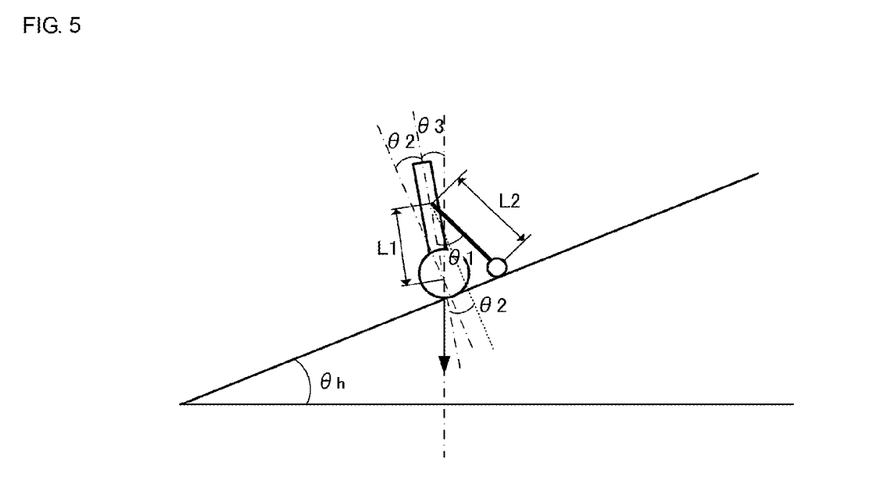
FIG. 5 illustrates the relationship between a ground inclination angle, a main body inclination angle and an intersection angle.

For example, as illustrated in FIG. 5, if the intersection angle of the main body 10 and the support 12 is denoted by $\theta_1$, the inclination angle of the main body 10 with respect to a direction orthogonal to the ground is denoted by $\theta_2$, the length of the main body 10 (length from position at which the main body 10 and the support 12 intersect up to the main wheels 11) is denoted by $L_1$ and the length of the support 12 (length from position at which the main body 10 and the support 12 intersect up to the stabilizing wheel 13) is denoted by $L_2$, from the relation $L_1 \cos\theta_2 = L_2 \cos(\theta_1 - \theta_2)$, the inclination angle $\theta_2$ of the main body 10 with respect to the direction orthogonal to the ground can be calculated from the following expression.

$$\theta_2 = \tan^{-1}\left(\frac{L_1 - L_2\cos\theta_1}{L_2\sin\theta_1}\right) \quad \text{[Math 1]}$$

In this way, as the first control mode, the coaxial two-wheel vehicle 1 performs control such that inverted pendulum control is performed and the posture of the main body 10 is maintained fixed. The coaxial two-wheel vehicle 1 of this embodiment is also able to execute a second control mode in which the coaxial two-wheel vehicle 1 continuously remains in place while performing inverted pendulum control.

Figure 4:
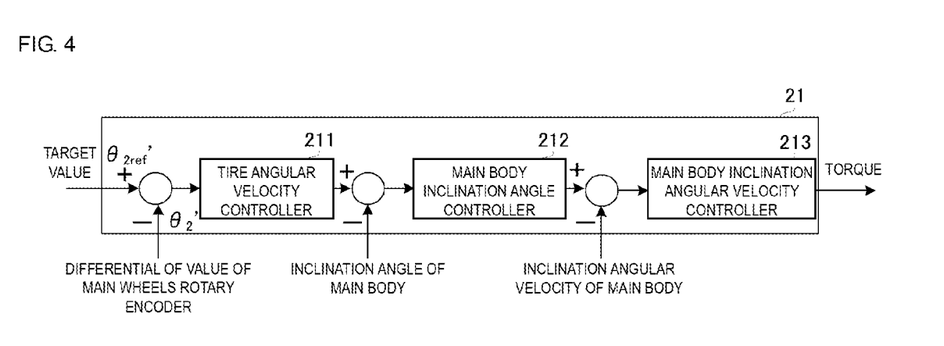
FIG. 4 is a block diagram of the control unit 21 at the time of a second control mode.

FIG. 4 is a block diagram of the control unit 21 at the time of the second control mode. The control unit 21 at the time of the second control mode includes a tire angular velocity controller 211 in addition to the configuration of the control unit 21 at the time of the first control mode illustrated in FIG. 3. The configurations and functions of the main body inclination angle controller 212 and the main body inclination angular velocity controller 213 are the same as those in the first control mode.

When a switching instruction is issued by a selector switch provided in the user I/F 28 for example, the first control mode and the second control mode are switched between. Taking the target value of the rotational angular velocity $\theta_{2ref}'$ of the main wheels 11 to be 0, the tire angular velocity controller 211 is input with the difference between this target value and the rotational angular velocity $\theta_2'$ of the main wheels 11 at the present time, which is a differential value of a signal output from the main wheels rotary encoder 26. The tire angular velocity controller 211 calculates an inclination angle $\theta_{1ref}$ for the main body 10 that will cause the difference to become zero.

The inclination angle $\theta_{1ref}$ is given by $\theta_{1ref} = (1/mgy_g)\cdot\tau_1$ from the relation $\tau_1 = mg\cdot\theta_{1ref}\cdot y_g$ (here, m is the mass of the main body 10 and g is the acceleration due to gravity), where $y_g$ is the center of gravity of the main body 10 and $\tau_1$ is the gravitational torque. Then, denoting the main wheels motor torque as $\tau_2$, $\tau_2 = J\cdot\theta_{2ref}''$ and $\theta_{2ref}'' = (\theta_{2ref}' - \theta_2')/T$ (here, T=time) from the relation between the angular acceleration and the moment of inertia and therefore if we consider that the gravitational torque is compensated for by the main wheels motor torque, since $\tau_1 = \tau_2$, $$\theta_{2ref}'' = \frac{1}{mgy_g} J \frac{\theta_{2ref}' - \theta_2'}{T}. \quad \text{[Math 2]}$$

Here, the tire angular velocity controller 211 performs integration processing so that the main body angle inclination angle will be output as zero when the input difference is instantaneously zero and the main body 10 will be prevented from moving.

In the second control mode, the calculated inclination angle becomes the target inclination angle. Then, the difference between the target inclination angle and the inclination angle of the main body 10 at the present time input from the inclination angle sensor 20 is input to the main body inclination angle controller 212. Thus, even if gravitational torque is exerted on a slope and the main wheels 11 rotate, a torque is calculated that will make the change in rotational angle become zero and therefore the coaxial two-wheel vehicle 1 remains in position at the point in time when switching to the second control mode is performed. Therefore, in the second control mode, it is possible to prevent the main body 10 from unintentionally moving due to the gravitational torque on a slope.

In the above-described example, switching between the first control mode and the second control mode is performed when a switching instruction is issued by the selector switch, but instead the grip 16 may be provided with a touch sensor and switching from the first control mode to the second control mode may be performed when it is detected that the user is not touching the grip 16. In this case, when it is detected that the user is touching the grip 16, switching from the second control mode to the first control mode is performed. In addition, switching from the first control mode to the second control mode may be performed once a certain period of time has elapsed after it has been detected that the user's hand has moved away.

The second control mode does not have to be executed while inverted pendulum control of the first control mode is being performed, and an angle control loop may be simply executed in which the vehicle continues to remain in place without an inverted pendulum control posture control loop being performed.

Figure 9:
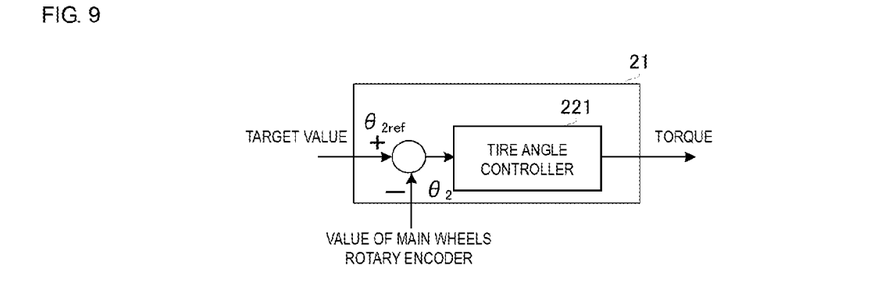
FIG. 9 is a block diagram of the control unit 21 at the time of a second control mode.

That is, as illustrated in FIG. 9, the control unit 21 includes only a tire angle controller 221 at the time of the second control mode. A rotational angle $\theta_{2ref}$, which is the value of a signal output from the main wheels rotary encoder 26 at the time point when switching was performed to the second control mode, is used as a target value and the tire angle controller 221 is input with the difference between the target value and a rotational angle $\theta_2$ of the main wheels 11 at the present time, which is the value of a signal output from the main wheels rotary encoder 26. The tire angle controller 221 calculates a torque to apply so that the difference will become zero. In this case as well, even if gravitational torque is exerted on a slope and the main wheels 11 rotate, a torque is calculated that will cause the change in rotational angle to become zero and therefore the coaxial two-wheel vehicle 1 remains in position at the point in time when switching to the second control mode is performed.

In the above-described example, a case has been given in which the detection of touching of the grip 16 by the user is used as a timing at which switching from the second control mode to the first control mode is to be performed, but instead a condition where the inclination angle of the main body 10 is within a certain range (for example, −5° to −3°) may be adopted as a switching condition. In the case where this certain range is set so as to be close to a target value of the inclination angle of the main body 10 in inverted pendulum control, since the inclination angle of the main body 10 negligibly changes once inverted pendulum control has started, the user will not notice anything untoward.

Figure 6:
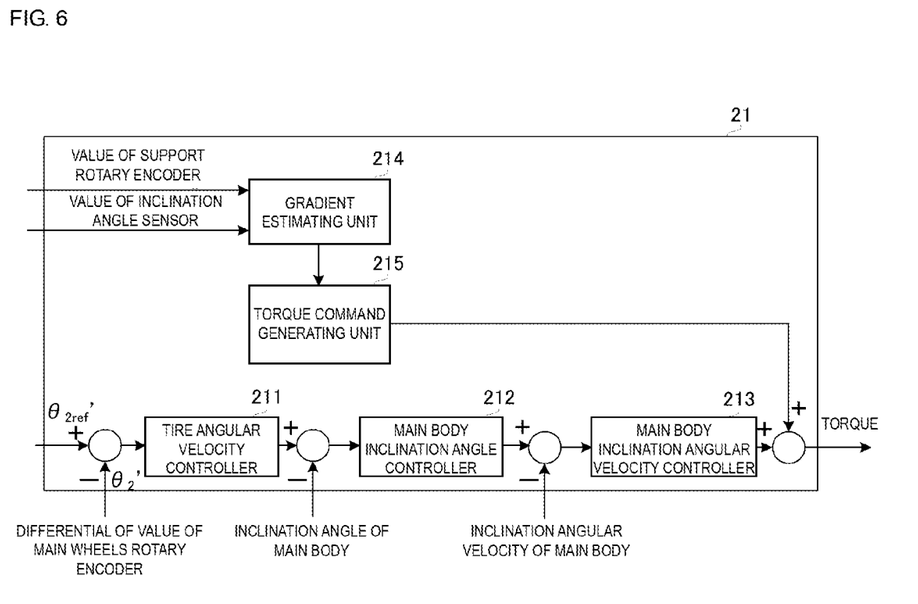
FIG. 6 is a block diagram of the control unit 21 according to modification 1.

Next, FIG. 6 is a block diagram of the control unit 21 according to modification 1. In the second control mode according to modification 1, in addition to the configuration of the control unit 21 at the time of the second control mode illustrated in FIG. 4, the control unit 21 is further equipped with a gradient estimating unit 214 and a torque command generating unit 215. The configurations and functions of the tire angular velocity controller 211, the main body inclination angle controller 212 and the main body inclination angular velocity controller 213 are the same as those illustrated in FIG. 4.

The gradient estimating unit 214 is input with a value of the support rotary encoder 27 (that is, the intersection angle $\theta_1$ of the main body 10 and the support 12) and the value of the inclination angle sensor 20 (that is, the inclination angle $\theta_3$ of the main body 10 with respect to the vertical direction) and estimates a ground inclination angle $\theta_h$.

As indicated by Math 1, the inclination angle $\theta_2$ of the main body 10 with respect to a direction orthogonal to the ground is obtained from the intersection angle $\theta_1$, the length $L_1$ of the main body and the length $L_2$ of the support 12. Thus, the ground inclination angle $\theta_h$ is obtained from $\theta_h = \theta_2 + \theta_3$.

Figure 7:
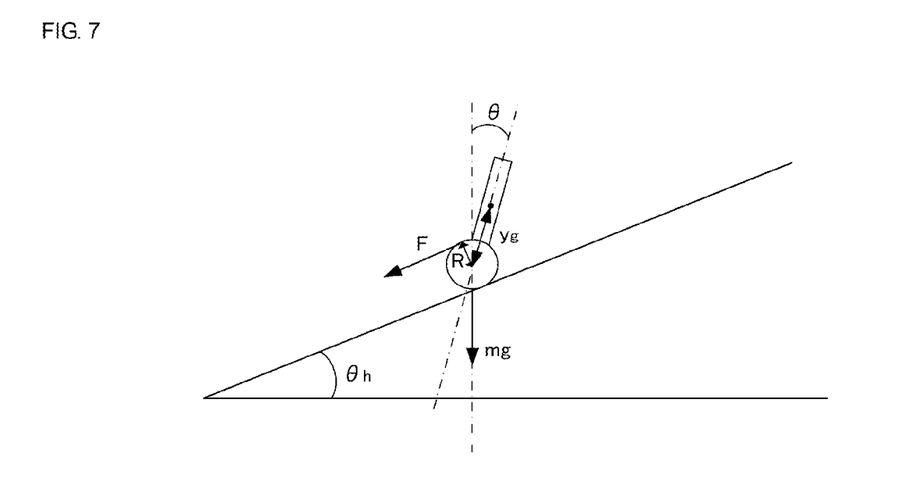
FIG. 7 illustrates the relationship between a ground inclination angle and a main body inclination angle.

The torque command generating unit 215 is input with the ground inclination angle $\theta_h$ estimated by the gradient estimating unit 214 and calculates a torque value to compensate for the gravitational torque generated by the ground inclination angle $\theta_h$. Therefore, the control unit 21 according to modification 1 adds the torque value calculated by the torque command generating unit 215 to the torque value calculated by the main body inclination angular velocity controller 213 and performs feed forward control. The gravitational torque $\tau_1$ generated by the slope, as illustrated in FIG. 7, is given by $\tau_1 = FR = mg \cdot \sin \theta_h \cdot R$ (here, m is the mass of the main body 10 and g is the acceleration due to gravity), where F is the propulsive force of the main wheels 11 generated along the inclination of the slope and R is the tire radius of the main wheels 11. Therefore, the torque command generating unit 215 adds a value "$\alpha \cdot mg \cdot \sin \theta_h \cdot R$" as a correction torque value obtained by multiplying $\tau_1$ by a certain feed forward coefficient $\alpha$ ($\alpha$ is 0 to 1) to the torque value calculated by the main body inclination angular velocity controller 213. Thus, when the main body 10 is on a slope, torque that compensates for the gravitational torque due to the ground inclination angle is applied to the main wheels 11 at the time point when switching to the second control mode is performed and therefore torque can be applied to the main wheels 11 before feedback control by the tire angular velocity controller 211 acts.

Figure 8:
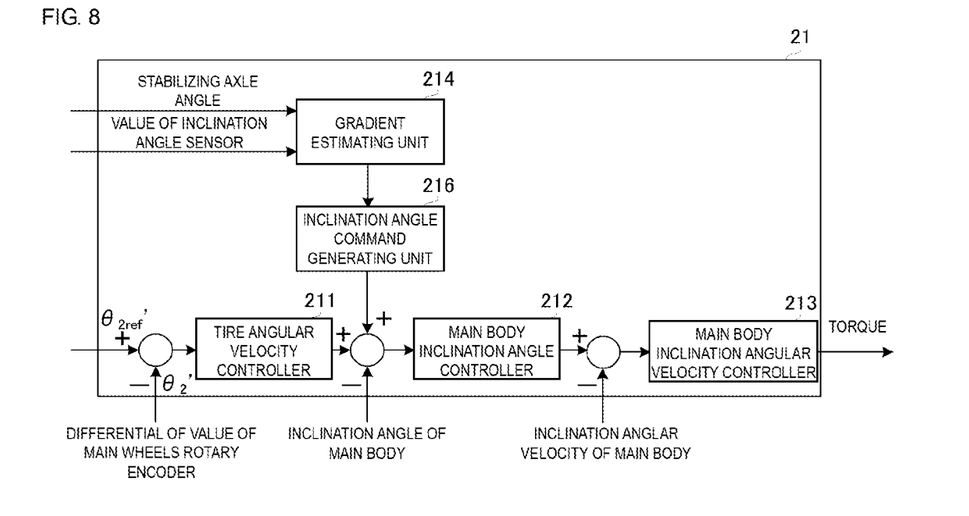
FIG. 8 is a block diagram of the control unit 21 according to modification 2.

Next, FIG. 8 is a block diagram of a control unit 21 according to modification 2. In the second control mode according to modification 2, in addition to the configuration of the control unit 21 at the time of the second control mode illustrated in FIG. 4, the control unit 21 is further equipped with the gradient estimating unit 214 and an inclination angle command generating unit 216. The configurations and functions of the tire angular velocity controller 211, the main body inclination angle controller 212 and the main body inclination angular velocity controller 213 are the same as those illustrated in FIG. 4.

The inclination angle command generating unit 216 is input with a ground inclination angle $\theta_h$ from the gradient estimating unit 214 and calculates an inclination angle of the main body 10 to compensate for the gravitational torque generated by the ground inclination angle $\theta_h$.

The gravitational torque $\tau_1$ due to the slope is given by $\tau_1 = FR = mg \cdot \sin \theta_h \cdot R$, as illustrated in FIG. 7. A torque counterforce $\tau_2$ generated due to the inclination angle of the main body 10 with respect to a vertical direction, is expressed by $\tau_2 = mg \cdot \sin \theta \cdot y_g$ (here, $y_g$ is the height of the center of gravity of the main body 10). Therefore, the inclination angle command generating unit 216 calculates a corrected inclination angle $\theta$ such that $\tau_1 = \tau_2$. Here, if $\sin \theta$ is close to $\theta$, $mg \cdot \theta_h \cdot R = mg \cdot \theta \cdot y_g$ and $\theta = (R/y_g) \cdot \theta_h$. Therefore, for example, if R=100 mm and $y_g$=300 mm, the main body 10 is caused to be inclined at around ⅓ of the ground inclination angle.

The inclination angle command generating unit 216 adds a value "$\beta \cdot \theta$", which is obtained by multiplying the corrected inclination angle $\theta$ calculated as described above by a certain feed forward coefficient $\beta$ ($\beta$ is 0 to 1), to the inclination angle calculated by the tire angular velocity controller 211. Thus, since the inclination angle of the main body 10, which is the target, is corrected to an inclination angle of the main body 10 obtained by compensating for the gravitational torque due to the ground inclination angle when the main body 10 is on a slope at the time point when switching to the second control mode is performed, torque can be applied to the main wheels 11 before feedback control by the tire angular velocity controller 211 acts.

10 . . . main body
11 . . . main wheels
12 . . . support
13 . . . stabilizing wheel
15 . . . handle
16 . . . grip
20 . . . inclination angle sensor
21 . . . control unit
22 . . . ROM
23 . . . RAM
24 . . . gyro sensor
25 . . . main wheels driving unit
26 . . . main wheels rotary encoder
27 . . . support rotary encoder
29 . . . hand brake
211 . . . tire angular velocity controller
212 . . . main body inclination angle controller
213 . . . main body inclination angular velocity controller

The invention claimed is:

1. A moving body comprising:
a wheel;
a main body for supporting the wheel rotatably in a pitch direction;
a driving control unit for controlling driving of the wheel;
angular change detection means for detecting an angular change of the main body in the pitch direction;
rotational angle detection means for detecting a rotational angle of the wheel; and
a storage unit for storing a program implementing a first control mode in which rotation of the wheel is controlled on the basis of an output of the angular change detection means such that the angular change of the main body becomes zero and such that an angle of the main body with respect to a vertical direction becomes a first angle, and a second control mode in which rotation of the wheel is controlled on the basis of an output of the rotational angle detection means such that a change in the rotational angle of the wheel becomes zero, wherein the driving control unit implements the first control mode and the second control mode by reading out and expanding the program, and the driving control unit includes switching means for switching between the first control mode and the second control mode, wherein a part of the main body includes touch detection means for detecting whether a person is touching the main body, wherein the switching means switches between the first control mode and the second control mode in accordance with an output of the touch detection means, and switches from the second control mode to the first control mode when a user is touching the grip.

2. The moving body according to claim 1, further comprising gradient detection means for detecting a ground gradient, wherein furthermore a torque compensating for a gravitational torque due to the ground gradient detected by the gradient detection means is applied in the second control mode.

3. The moving body according to claim 1, further comprising gradient detection means for detecting a ground gradient, wherein furthermore an angle of the main body to the vertical direction compensating for the gravitational torque due to the ground gradient detected by the gradient detection means is calculated and the first angle is corrected in the second control mode.

4. The moving body according to claim 1, further comprising gradient detection means for detecting a ground gradient, wherein furthermore a torque compensating for a gravitational torque due to the ground gradient detected by the gradient detection means is applied in the second control mode.

5. The moving body according to claim 1, further comprising gradient detection means for detecting a ground gradient, wherein furthermore an angle of the main body to the vertical direction compensating for the gravitational torque due to the ground gradient detected by the gradient detection means is calculated and the first angle is corrected in the second control mode.

6. The moving body according to claim 1, the switching means switches from the first control mode to the second control mode when the user is not touching the grip.

7. The moving body according to claim 1, the switching means switches from the second control mode to the first control mode when the user is touching the grip and with a condition where an inclination angle of the main body is within a certain range.

* * * * *